United States Patent [19]

Stokich, Jr.

[11] Patent Number: 5,185,391
[45] Date of Patent: Feb. 9, 1993

[54] OXIDATION INHIBITED ARYLCYCLOBUTENE POLYMERS

[75] Inventor: Theodore M. Stokich, Jr., Midland, Mich.

[73] Assignee: The Dow Chemical Company, Midland, Mich.

[21] Appl. No.: 800,787

[22] Filed: Nov. 27, 1991

[51] Int. Cl.$^5$ .................. C07F 7/08; C07B 63/04; C08K 5/3435; C08K 5/3437; C08K 5/36; C08K 5/18; C08K 5/13

[52] U.S. Cl. .................. 524/87; 556/401; 524/102; 524/103; 524/255; 524/288; 524/291; 585/856; 585/860; 585/866; 585/899

[58] Field of Search .......... 524/288, 291, 255, 102, 524/103, 89, 87; 585/856, 860, 866, 899; 526/279, 284, 280; 556/401

[56] References Cited

U.S. PATENT DOCUMENTS

| | | | |
|---|---|---|---|
| 3,991,139 | 11/1976 | Kokuryo | 524/304 |
| 4,540,763 | 9/1985 | Kirchoff | 526/284 |
| 4,622,375 | 11/1986 | Wong | 526/284 |
| 4,642,329 | 2/1987 | Kirchoff et al. | 526/281 |
| 4,783,514 | 11/1988 | Kirchoff et al. | 526/281 |
| 4,812,588 | 3/1989 | Schrock | 556/453 |
| 4,822,839 | 4/1989 | Paisner | 524/349 |
| 4,960,593 | 10/1990 | Sevini et al. | 524/99 |

*Primary Examiner*—Veronica P. Hoke
*Attorney, Agent, or Firm*—Charles J. Enright

[57] ABSTRACT

The invention is a composition containing a polymer formed by side ring opening of an arylcyclobutene compound and an effective amount of an antioxidant.

9 Claims, No Drawings

OXIDATION INHIBITED ARYLCYCLOBUTENE POLYMERS

BACKGROUND OF THE INVENTION

This invention relates to polymeric compositions made from arylcyclobutene containing monomers and methods for preventing autoxidation of said polymers.

Arylcyclobutene monomeric compositions are useful in preparing thermoset and thermoplastic polymeric compositions. Such polymeric compositions are highly desirable because they exhibit hydrophobicity, excellent thermal stability, chemical resistance and electrical insulative properties. Such polymeric compositions typically can exhibit thermal degradation temperatures above 300° C., are insoluble in many organic solvents and in water and have dielectric constants of less than 3.0 at 1 MHz. Therefore, they find uses as films, coatings, adhesives and as interlayer dielectrics in multichip modules and other multilayer electronic circuits.

Johnson et al. disclose in IEEE Transactions On Components, Hybrids, and Manufacturing Technology, Vol. 13, No. 2, June, 1990, that a polymer of

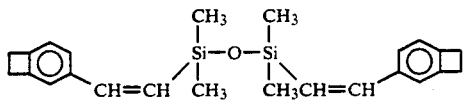

1,3-bis(2-bicyclo[4.2.0]octa-1,3,5-trien-3-ylethenyl)-1,1,3,3-tetramethyldisiloxane (hereinafter DVS), available as a partially polymerized solution in mesitylene from The Dow Chemical Company as XU13005.02L (hereinafter partially thermally polymerized DVS or DVS prepolymer) may be used as an interlayer dielectric to construct thin film multichip modules. The partially thermally polymerized DVS may be applied by spin coating a solution of a prepolymer onto a substrate, evaporating the solvent and then polymerizing by heating to 250° C. for one hour in nitrogen. Catalysts and/or initiators are not required for the polymerization.

When exposed to air arylcyclobutene polymers undergo oxidation. At elevated temperatures the oxidation is accelerated. When the polymer oxidizes, its electrical insulating properties are degraded. Oxidation may lead to a yellow discoloration of the polymer, and in severe cases to an amber color even in thin films.

One may encapsulate the arylcyclobutene polymer by forming an oxygen barrier around it. However, this adds costly steps to a fabrication process. Barrier coatings are also subject to breakage and/or cracking, particularly under thermal cycling, which leads to loss of the barrier protection.

To preserve optical clarity and important electrical properties such as low dielectric constant and low water uptake without the use of hermetic packaging or barrier coatings, it would be advantageous to have an arylcyclobutene polymer composition that is less susceptible to oxidation when exposed to air.

SUMMARY OF THE INVENTION

The invention is a composition containing a compound containing an arylcyclobutene moiety and an antioxidant selected from the group consisting of compounds of the formulae:

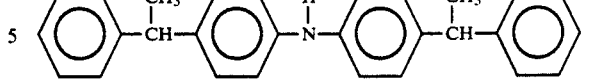

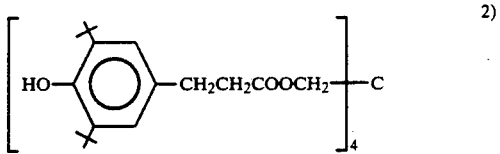

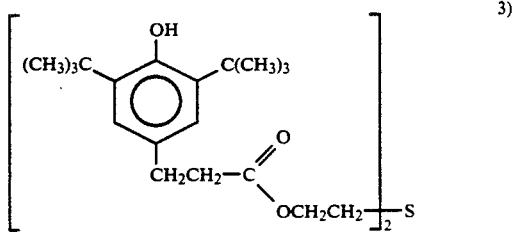

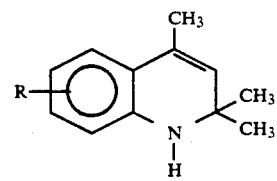

wherein
R is hydrogen, an electron withdrawing or electron donating group; and oligomers thereof;

5) hindered amines of the formula:

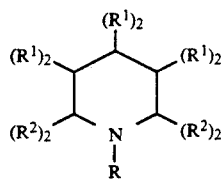

wherein
R is hydrogen, an electron withdrawing group or an electron donating group:
each $R^1$ is independently, hydrogen, an electron withdrawing group or an electron donating group, with the proviso that two $R^1$ attached to the same carbon may represent a single moiety joined to said carbon by a double bond:
each $R^2$ is independently, methyl, ethyl, n-propyl or isopropyl:
said antioxidant being effective to inhibit oxidation of polymer formed by side ring opening of the arylcyclobutene.

In another aspect, the invention is a composition containing a polymer formed by side ring opening of an arylcyclobutene moiety and an amount of said antioxidant sufficient to inhibit oxidation of the polymer.

In another aspect, the invention is a method for inhibiting oxidation of a polymer formed by the side ring opening of compounds containing one or more arylcyclobutene moieties by adding to the monomer compound, the prepolymer or polymer of the compound, an amount of said antioxidant sufficient to inhibit oxidation of the polymer.

In another aspect, the invention is an article containing a component which is a polymer formed by side ring opening of an arylcyclobutene moiety and an amount of said antioxidant sufficient to inhibit oxidation of the polymer.

A feature of the invention is that the polymer formed by side ring opening of an arylcyclobutene moiety contains said oxidation inhibitor in an amount effective to prevent oxidation of said polymer.

An advantage of the invention is that said oxidation inhibitors inhibit oxidation of the polymer formed by side ring opening of an arylcyclobutene moiety. Inhibition of oxidation delays an increase in the dielectric constant and the formation or darkening of color in the polymer. An additional advantage is that said oxidation inhibitors are compatible with the compositions in that they do not precipitate or separate from the composition and thus become ineffective. An additional advantage is that cured films may have substantially the same dielectric constant as the uninhbited cured films. An additional advantage is that cured films may have the same hydrophobicity as the uninhbited cured films.

DETAILED DESCRIPTION

In one aspect, the compositions of this invention contain compounds having an arylcyclobutene moiety. Compounds having one arylcyclobutene moiety are referred to hereinafter as mono-arylcyclobutene compounds. Compounds containing two or more arylcyclobutene moieties are hereinafter referred to as poly-arylcyclobutene compounds. Compounds containing arylcyclobutene moieties are described in U.S. Pat. Nos. 4,724,260: 4,783,514: 4,826,997: 4,965,329: 4,661,193: 4,642,329: 4,999,449: 4,540,763: 4,812,588: all of which are incorporated herein by reference. Preferred monoarylcyclobutene compounds contain a 1,2 diaromatic substituted ethylenically unsaturated moiety such as those described in U.S. Pat. No. 4,783,514, a maleimide moiety such as those described in U.S. Pat. No. 4,826,997: or another moiety which is reactive with an arylcyclobutene moiety. Exemplary poly-arylcyclobutenes are those formed by the partial polymerization of monoarylcyclobutenes, those disclosed in U.S. Pat. No. 4,999,449, the DVS monomer described hereinbefore and partially thermally polymerized compositions of said monomer.

The inventive composition can contain other materials which do not interfere with the usefulness of the composition such as, for example, monomers copolymerizable with the arylcyclobutene compounds such as other monomers containing arylcyclobutene moieties, ethylenically unsaturated moieties, acetylenic moieties, and other compositions which can undergo addition polymerization reactions: miscible compositions, such as blowing agents, fire-retarding agents and the like: reinforcing fillers such as glass or carbon fibers, organic fibers such as aramid fibers or the like: fillers such as quartz glass, powdered silica and the like: metal and ceramic powders for electrical conductive and insulative properties and the like.

The inventive composition may also be partially polymerized. To be partially polymerized, at least some of the side rings of the arylcyclobutene compounds are opened and reacted to create dimers, trimers and higher oligomers and polymers. However, some of the side rings of the arylcyclobutene compounds remain unreacted in the partially polymerized composition. The mixture comprising the partially polymerized form may contain unreacted monomer, oligomers, polymers in a variety of branching configurations and gelled polymer as well as materials described hereinbefore as optional components of the inventive composition. Preferably, the partially polymerized composition is not polymerized to its gel point. For DVS. one may use FT-IR to measure the appearance of the tetralin structure at 1500 cm$^{-1}$, the disappearance of the side rings at 1472 cm$^{-1}$ or the vinyl groups at 985 cm$^{-1}$. One may eliminate concentration and path length differences between samples by measuring the absorbance ratio of these peaks to the peak at 1254 cm$^{-1}$ for the Si-methyl rocking mode which remains constant through the polymerization and curing process. Using a given polymerization method, one may determine the degree of polymerization that gives undesirable gels empirically and then use that number to monitor subsequent polymerizations. Typically, for DVS, about 35–40% polymerization is preferred.

Aryl moieties are those referred to as aromatic compounds which contain $(4n+2)\pi$ electrons as described in Morrison and Boyd, *Organic Chemistry*, 3rd ed., 1973. Examples of suitable aryl moieties include benzene, napthalene, phenanthrene, anthracene, pyridine, a biaryl moiety, or 2 or more aromatic moieties bridged by alkylene or cycloalkylene moieties. Preferred aryl moieties are benzene, napthalene, biphenyl or pyridine moieties. The most preferred aryl moiety is a benzene moiety.

An arylcyclobutene moiety is a aryl moiety to which one or more cyclobutene rings are fused such that the two carbons of the cyclobutene rings, not part of the benzene ring, are bonded directly to two adjacent carbons on the same aryl ring. Exemplary structures include:

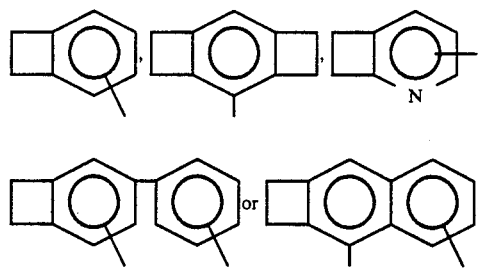

The 'side ring' of an arylcyclobutene contains two carbon atoms not in the aromatic ring that are connected to adjacent carbon atoms on the same aryl ring, the bond between said carbon atoms and the two bonds between the carbon atoms and the aryl ring.

Arylcyclobutenes are thought to react by the opening of this ring between the two carbon atoms which can produce an orthoxylylene moiety as a reactive intermediate. The orthoxylylene moiety is a diene which may react with dienophiles and with other orthoxylylene moieties. The orthoxylylene moiety may also participate in free radical reactions. A feature of the side ring opening reaction is the breaking of the bond between the two side ring carbons and their bonding to other atoms.

The side ring of the arylcyclobutene can be opened by subjecting it to sufficient heat. Typically, temperatures from about 150° C. to 300° C. are sufficient to open the ring. Polymerization solvents, catalysts or initiators are unnecessary. Preferably, the side ring opening is conducted in an inert atmosphere such as nitrogen containing less than 100 ppm oxygen.

One may also cure a thin film of an arylcyclobutene by passing it through an infrared furnace with an inert atmosphere such as nitrogen. This will permit cures to 92% conversion at 300° C. in 20 seconds with a total thermal cycle time of three minutes above room temperature.

Electron-donating moieties are molecular or nuclear groups which donate electrons more than a hydrogen atom would if accompanying the same site. Electron-withdrawing moieties are groups which more readily withdraw an electron relative to a hydrogen atom.

Examples of suitable electron-withdrawing moieties include $-NO_2$, $-CN$, Br, I, Cl, F, $-CO_2H$, $-CO_2R$,

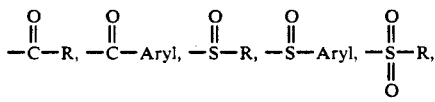

and aryl.

Examples of suitable electron-donating moieties include alkyl, aryl, alkoxy, aryloxy, hydrocarbyl, hydrocarbyloxy, hydrocarbylthio, $-OH$, $-OR$, $-NH_2$, $-NHR$, $-NR_2$.

Hydrocarbyl refers to any organic moiety containing only carbon and hydrogen atoms: hydrocarbyloxy refers to such organic moieties which further contain a hydroxyl moiety: and hydrocarbylthio refers to organic moieties which further contain a thiol moiety.

In a second aspect of this invention, a polymer is formed by side ring opening of an arylcyclobutene compound. This polymer contains structures which are susceptible to autoxidation. Exemplary structures contain benzylic hydrogens.

Exemplary structures include:

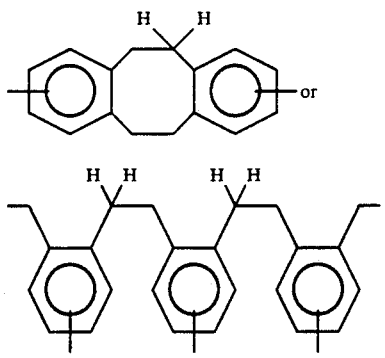

which are two of the possible structures formed when two side rings open and react with each other; and

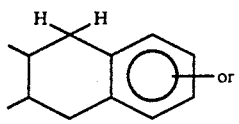

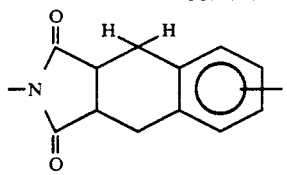

wherein one side ring opens forming the orthoxylylene which reacts with a dienophile, the first instance being an example of the product formed by the reaction of the orthoxylylene and a vinyl group and the second being an example of the product formed by the reaction of the orthoxylylene and a maleimide.

Some of the benzylic hydrogens in these structures are depicted for the purpose of illustration.

When thin films of the arylcyclobutene polymers depicted are exposed to elevated temperatures such as 100° C. or 200° C. for extended periods of time, such as 200 hours, in an inert atmosphere, such as nitrogen, there may be no changes in the dielectric constant or the FT-IR spectrum. When thin films of the arylcyclobutene polymers depicted are exposed to oxygen containing atmospheres such as air, they form a yellow color, the dielectric constant increases and the FT-IR spectrum changes The oxidized arylcyclobutene polymer absorbs water more readily than unoxidized arylcyclobutene polymer. Any increase in water content leads to a further increase in the dielectric constant. The changes in the dielectric constant and those in the FT-IR spectrum directly correlate, so that one may monitor changes in the dielectric constant by measuring changes in the FT-IR spectrum.

FT-IR studies show that sites with benzylic hydrogens are generally more susceptible to oxidation than other sites in the polymer or prepolymer. For such studies, thin films of the arylcyclobutene polymer are placed on bare silicon substrates having no silicon oxide coating so that the strong absorbance of silicon oxide does not mask the FT-IR spectrum in the area of interest. One may monitor the FT-IR bands at 2952, 1700, 1500, 1254 or 1050 cm$^{-1}$. The band at 1500 cm$^{-1}$ is particularly useful as it indicates a ring bending mode for the polymer's tetrahydronaphthalene structure. The spectral absorbance of this band decreases with the decrease in concentration of the tetrahydronaphthalene structure as oxidation occurs. The broad band between 1800–1600 cm-1, particularly at 1700 cm$^{-1}$ is an absorption band for aryl carbonyl moieties. The absorbance of this band increases with the concentration of benzylic carbonyls. During polymer thin film oxidation, there is a strong correlation between the reduction in the absorbance at 1500 cm$^{-1}$ and the increase in absorbance at 1700 cm$^{-1}$.

The 'dielectric' lifetime or as hereinafter nominated, the 'lifetime' of a thin film polymer coating made from a compound containing an arylcyclobutene moiety is nominally defined as the time it takes at a given temperature in air for the dielectric constant of the polymer to increase by ten percent. This approximately correlates with the time it takes for the FT-IR absorbance band at 1500 cm$^{-1}$ to decrease to 80% of its initial value. It also correlates well with the time it takes for the absorbance at 1700 cm$^{-1}$, divided by the film thickness, to reach 0.02 μm$^{-1}$. Since changes in the FT-IR spectrum are easier to measure than changes in the dielectric constant, the changes in the FT-IR may be used to measure lifetimes.

The preferred arylcyclobutene compounds of this invention include compounds of the structure

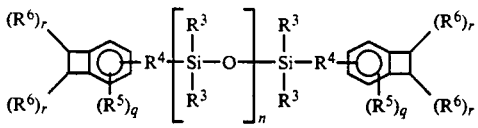

wherein each $R^3$ is independently $C_{1-6}$ alkyl, cycloalkyl, aralkyl, or phenyl;

each $R^4$ is independently ethenyl, propenyl or 2-methyl propenyl:

each $R^5$ is independently $C_{1-6}$ alkyl, methoxy, or chloro:

each $R^6$ is independently $C_{1-6}$ alkyl, chloro, or cyano:

n is an integer of 1 or more: and each q and r is independently an integer of zero or 1.

The most preferred compound (DVS) is represented by the formula:

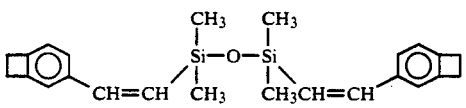

The depictions of this compound herein should not be construed to define any particular geometric isomer or spatial orientation about the ethenylene double bonds. Compounds made by the processes disclosed herein contain positional isomers about these double bonds.

These organopolysiloxane bridged bisbenzocyclobutene monomers can be prepared by methods disclosed in U.S. Pat. No. 41812,588: U.S. patent application Ser. Nos.: 676,622, filed Mar. 28, 1991: 677,023, filed Mar. 28, 1991; and 694,521, filed Apr. 30, 1991: all of which are incorporated herein by reference.

These organopolysiloxane bridged bisbenzocyclobutene monomers can be prepared by reacting an excess of a 3- or 4-halo benzocyclobutene, preferably 4-bromobenzocyclobutene, with the desired diterminal vinyl, allyl or methallyl organopolysiloxane compound. Typically, a molar ratio of the bromobenzocyclobutene to the organopolysiloxane bridging group of at least 1.5:1 is desired, preferably at least 2:1.

Preferably, the bromobenzocyclobutene is a 4-bromobenzocyclobutene represented by the formula:

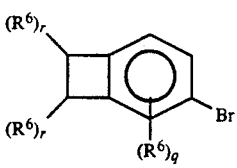

wherein $R^5$ is $C_{1-6}$ alkyl, methoxy, or chloro:

$R^6$ is $C_{1-6}$ alkyl, chloro, or cyano: and each q and r is independently an integer of zero or 1.

A preferred organopolysiloxane compound is represented by the formula:

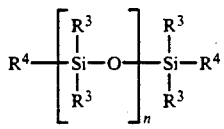

wherein each $R^3$ is independently $C_{1-6}$ alkyl, cycloalkyl, aralkyl, or phenyl:

each $R^4$ is independently vinyl (—CH═CH$_2$), allyl (—CH$_2$—CH═CH$_2$), or methallyl

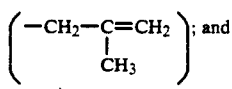

n is an integer of 1 or more.

For $R^3$, the preferred cycloalkyl is cyclohexyl and the preferred aralkyl is benzyl. Most preferably, $R^3$ is methyl, $R^4$ is vinyl and q and r are O.

The coupling reaction of the organopolysiloxane compound with the halobenzocyclobutene is possible because the organopolysiloxane compound is a bisvinyl or bisallyl bridging group. The substitution reaction of an olefinic compound possessing at least one hydrogen on a vinylic position with an organic halide is known and disclosed in U.S. Pat. No: 3,922,299 (Heck).

Heck discloses the substitution reaction of aryl halides with olefinic compounds in the presence of a Group VIII metal, a trivalent arsenic or phosphorous compound, and a soluble trialkylamine. The reaction displaces a hydrogen on a vinylic or allylic position with the organic compound. For example, the most preferred bisbenzocyclobutene monomer can be prepared by reacting about 2 moles of bromobenzocyclobutene with about one mole of 1,3-divinyl-1,1,3,3-tetramethyl-disiloxane in the presence of a catalytic amount of palladium acetate and tri(ortho-tolyl)phosphine, in addition to triethylamine, which acts as an acid scavenger.

Organopolysiloxanes and processes for preparing them are known and disclosed in U.S. Pat. Nos. 3,584,027: 3,701,195: 3,770,,768: and 3,803,196. Processes for preparing bromobenzocyclobutene are disclosed in U.S. Pat. Nos. 4,822,930 and 4,891,455 and by Lloyd et al., *Tetrahedron.* Vol. 21, pp. 245-254 (1965) at page 253.

Following one of the procedures for making the preferred monomer, one will obtain a mixture containing as a major component divinyltetramethyldisiloxane-bisbenzocyclobutene monomer. This monomer mixture has a low viscosity.

Partial thermal polymerization of the arylcyclobutene compound forms a prepolymer which may have more desirable properties in use, such as a wider temperature range between the melting point and the cure temperature and a more desirable viscosity. The prepolymer retains its solubility in organic solvents because it is not polymerized to the gel point. The prepolymer may retain its density and shrinks less than the monomer upon curing. The prepolymer can be employed to prepare cured polymeric compositions.

If the arylcyclobutene compound is not already a liquid, it will often melt to a liquid upon heating before it polymerizes. The melted arylcyclobutene compound, typically, has a low viscosity. As polymerization proceeds, the arylcyclobutene compound reaction mixture becomes more viscous.

The prepolymer contains both reacted and unreacted polymerization sites. It may contain completely unreacted arylcyclobutene compound, oligomers and cured polymer as well as other unreacted materials included in the arylcyclobutene compound.

In one method of forming the prepolymer by partial thermal polymerization, an amount of the arylcyclobutene compound is heated to a temperature sufficient to initiate and sustain polymerization. Arylcyclobutene compounds may also be partially polymerized with any type of radiation such as X-ray or E-beam or in any way that will lead to polymerization. Polymerization with E-beam or X-ray is not recommended for compositions already containing the antioxidants represented in group 4) such as AgeRite ® MA.

Partial thermal polymerization may be effected over a wide range of temperatures. The lower the temperature the longer the process will take. Partial thermal polymerization takes place at a temperature effective to polymerize the arylcyclobutene compound. Such a temperature is preferably above 150° C. and below 220° C. The reaction mixture is removed from the heat after it attains an appropriate viscosity which is greater than the initial viscosity of the melted arylcyclobutene compound and which enables more effective use of the partially polymerized composition.

The viscous, partially thermally polymerized composition can be employed as a film wherein an effective amount of the neat partially polymerized composition is applied to a surface, and subsequently further polymerized. Or, the partially polymerized composition can be mixed with a suitable solvent. The solution can then be applied to a surface, the solvent evaporated, and the partially polymerized composition further polymerized to provide a polymer film.

The partial thermal polymerization of DVS to form partially thermally polymerized DVS may be performed by heating the DVS at 195° C. for two hours under nitrogen or alternatively, by heating the DVS at 170° C. for 22 hours under nitrogen. Most preferably, the DVS is heated and stirred at 160°-180° C. for a period of time of about 20-24 hours, to reach a weight averaged molecular weight of 30-35,000 as measured by gel permeation chromatography against a polystyrene standard.

The partially thermally polymerized DVS and fully cured DVS may contain units of the formula

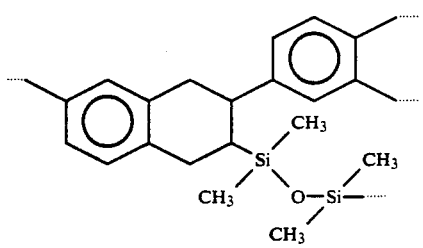

wherein the tetralin structure is formed by the Diels-Alder reaction of one of the vinyl groups and the side ring opening of one of the benzocyclobutene moieties.

When coating a substrate with a benzocyclobutene, it may be desirable to use an adhesion promoter. Suitable adhesion promoters include triethoxyvinylsilane (CAS#78-08-0) and other organosilane adhesion promoters as taught for example in U.S. Pat. No. 4,831,172 which is incorporated herein by reference.

The adhesion promoter is most advantageously used when bonding the polymer to an inorganic surface. The adhesion promoter may be coated onto the surface prior to application of the compound containing an arylcyclobutene functionality or it may be mixed in and applied with the compound containing an arylcyclobutene functionality. Preferably the triethoxyvinylsilane adhesion promoter is applied as a thin coating to the surface and a partially thermally polymerized DVS in solution is coated over it. Then, after removal of the solvent, the adhesion promoter and partially thermally polymerized DVS are subjected to conditions sufficient to polymerize the DVS at least beyond its gel point.

The gel point is described in the *Concise Encyclopedia Of Polymer Science And Engineering;* Wiley Interscience, 1990, pp. 430-2, which is incorporated herein by reference. The gel point describes a critical point in the polymerization from a monomer to a fully cured polymer. Before the gel point, the polymer is soluble in good solvents. It is called a sol and is a liquid even if highly viscous. Beyond the gel point the polymer is not completely soluble, even in a good solvent. However low molecular weight fractions (sol fraction) may still be extractable.

Preferably, the gel point can be defined as that point wherein one part of polymer will not completely dissolve in 100 parts of a good solvent at its boiling point. Good solvents include aromatic hydrocarbons such as toluene, xylene, mesitylene; aliphatic hydrocarbons such as pentane, hexane; hetero atom containing hydrocarbons such as N-methyl pyrrolidone, methyl ethyl ketone and the like. More preferably the gel point can be defined as that point wherein one part of polymer will not completely dissolve in ten parts of xylene at its boiling point.

Antioxidants and stabilizers may be chosen from broad classes of known materials such as those disclosed in: *Oxidation Inhibition In Organic Materials,* Ed. Pospisil and Klemchuk, CRC Press, Inc., Boca Raton, Florida, 1990, which is incorporated herein by reference.

Antioxidants useful in this invention are those effective to prevent autoxidation of a polymer made by the side ring opening of an arylcyclobutene.

Exemplary antioxidants include:

1) a compound of the formula:

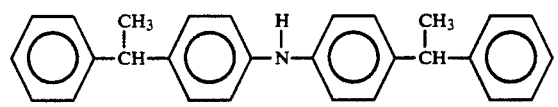

which is nominally called 4,4'-bis(α-methylbenzyl)diphenylamine and is commercially available from Goodyear as Wingstay ® 29.

2) a compound of the formula:

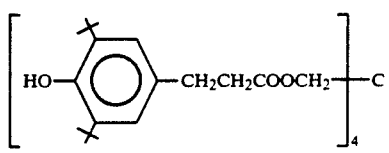

which is nominally called tetrakis [methylene (3,5-di-tert-butyl-4-hydroxyhydrocinnamate)]methane (CAS No. 6683-19-6) and is commercially available from Ciba-Geigy as Irganox ®1010.

3) a compound of the formula:

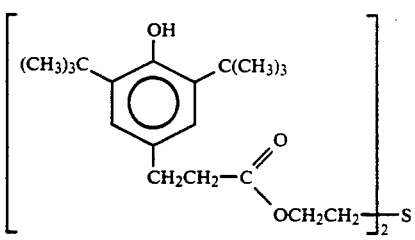

which is nominally called thiodiethylene bis-(3,5-ditert-butyl-4-hydroxy)hydrocinnamate (CAS No. 41484-35-9) and is commercially available from Ciba-Geigy as Irganox ® 1035.

4) compounds of the formula:

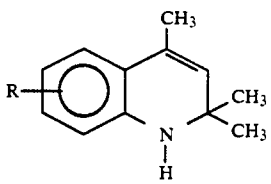

wherein

R is hydrogen, an electron withdrawing or electron donating group; and oligomers thereof. Preferrably R is hydrogen, but it also can be any substituent that does not interfere with the antioxidant activity of the compound. Preferred R substituents are phenyl, $C_{1-20}$ alkyl and alkoxy.

This group also contains the oligomer of the formula

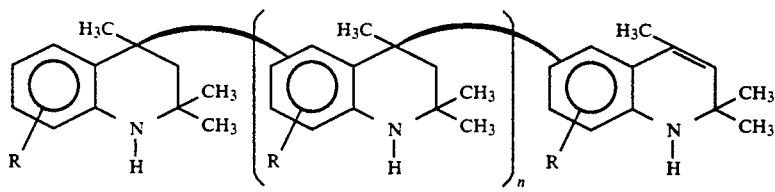

wherein R is as hereinbefore defined and n is 0–6.

2,2,4-trimethyl-1,2-dihydroquinoline, wherein R is hydrogen, is available as AgeRite ® MA from R. T. Vanderbilt as an oligomer with a degree of polymerization of about 3 or 4 (n is about 1 or 2). 6-ethoxy-2,2,4-trimethyl-1,2-dihydroquinoline, wherein R is ethoxy, is available as Permanax ® ETMQ from Vulnax. 6-dodecyl-2,2,4-trimethyl-1,2-dihydroquinoline, wherein R is dodecyl, is available as Santoflex ® DD from Monsanto.

The hereinbefore recited oligomer is available as Goodrite ® 3140 or AgeRite ® MA X9 Type from B. F. Goodrich wherein the manufacturer is said to remove the terminal vinyl group and n is 0–6.

5) hindered amines of the formula:

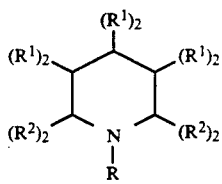

wherein

R is hydrogen, an electron withdrawing group or an electron donating group:

each $R^1$ is independently, hydrogen, an electron withdrawing group or an electron donating group, with the proviso that two $R^1$ attached to the same carbon may represent a single moiety joined to said carbon by a double bond: and each $R^2$ is independently, methyl, ethyl, n-propyl or isopropyl.

These compounds belong to a known class called hindered amine light stabilizers as described in *Oxidation Inhibition In Organic Materials*, Ed. Pospisil, J. and Klemchuk, P. P., CRC Publishing, Boca Raton, Fla., 1990, Vol. II, pp. 1–28, which is hereby incorporated by reference. The structure includes a six membered ring with one or two nitrogen atoms and four or five carbon atoms and no hydrogens on the carbon atoms adjacent to the hindered nitrogen atoms.

In order to prepare these compounds one may react acetone or another appropriate ketone with ammonia under known conditions to form triacetoneamine or a derivative thereof. This is then reduced to make the alcohol of the formula:

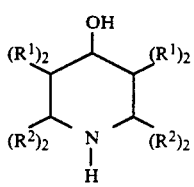

$R^1$ and $R^2$ are selected based on the ketone used in the synthesis. The hydroxy function may be converted to an ester function by treatment with the appropriate acid and removal of by-product water using conventional techniques. The ketone function may be converted to an amine function by treatment with the appropriate amine with catalyst and hydrogen using conventional techniques.

Exemplary structures include:

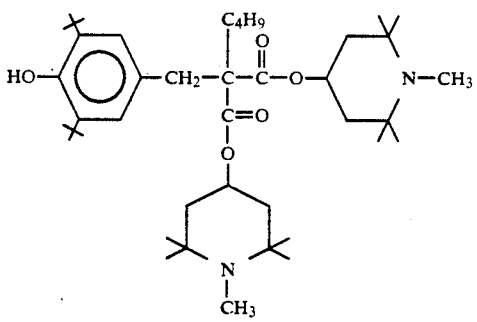

which is available as Tinuvin® 144 from Ciba-Geigy:

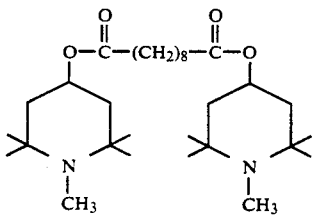

which is available as Tinuvin® 292 or Tinuvin® 765 from Ciba-Geigy or as Sanol® LS-292 from Sankyo Co. Ltd.;

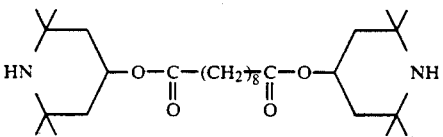

which is available as Tinuvin® 770 from Ciba-Geigy or as Sanol® LS-770 from Sankyo Co. Ltd.;

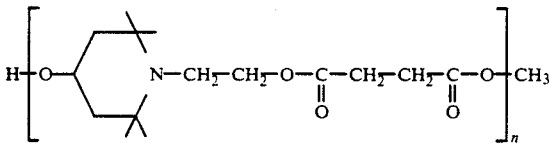

which is available as Tinuvin® 662 from Ciba-Geigy;

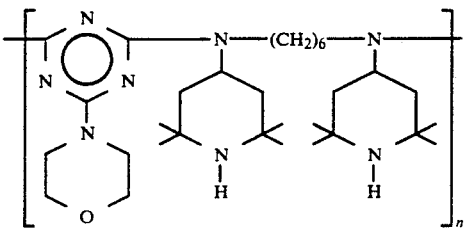

which is available as Cyasorb® UV-3346 from American Cyanamid Co.;

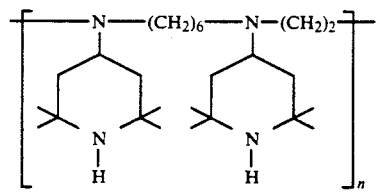

which is available as Spinuvex® A-36 from Montefluos, (Borg-Warner for U.S. and Canada);

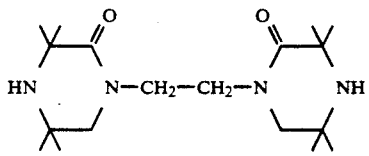

which is available as Goodrite® 3034 from B. F. Goodrich;

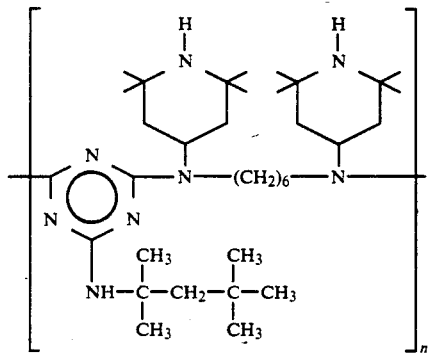

which is available as Chimassorb® 944 from Ciba-Geigy.

The antioxidant is added to a compound containing an arylcyclobutene moiety in a manner in which is effective to inhibit oxidation of polymer formed by side ring opening of the arylcyclobutene. The antioxidant may be combined with an arylcyclobutene monomer in liquid or solid form. The arylcyclobutene monomer and antioxidant may both be dissolved in a mutual solvent. The antioxidant may be dissolved in a liquid arylcyclobutene monomer. As the arylcyclobutene monomer is heated to polymerize it, the antioxidant may mix uniformly with it and maintain intimate contact with the polymer.

The antioxidant may be added to a partially polymerized compound containing an arylcyclobutene moiety. The arylcyclobutene prepolymer and antioxidant may both be dissolved in a mutual solvent. The antioxidant may be dissolved in a liquid partially polymerized arylcyclobutene monomer. As the partially polymerized arylcyclobutene monomer is heated to polymerize it, the antioxidant may mix uniformly with it and maintain intimate contact with the polymer.

Preferably, effective antioxidants for polymers formed by side ring opening of an arylcyclobutene moiety, will survive the polymer cure without decomposing, blooming, evaporating or reacting disadvantageously with the monomer containing an arylcyclobutene moiety. AgeRite® MA may deteriorate in effect if the monomer or prepolymer composition containing it is polymerized using electron beam (E-beam) radiation.

The antioxidant is added to a compound containing an arylcyclobutene moiety in an amount which is effective to inhibit oxidation of polymer formed by side ring opening of the arylcyclobutene. The lower limit is defined by the amount necessary to obtain measureable extension of the oxidation lifetime. The upper limit is defined by the amount of antioxidant which degrades polymer properties to an unacceptable level or beyond which additional antioxidant does not extend the useful lifetime. A preferred amount ranges from about 0.1-10 weight percent of the antioxidant based on the compound containing an arylcyclobutene moiety. A more preferred amount ranges from about 0.5-6 weight percent of the antioxidant based on the compound containing an arylcyclobutene moiety. A most preferred amount for the DVS ranges from about 1-4 weight percent of the Agerite ® MA antioxidant based on the DVS.

Since the DVS polymer finds a major use as a thin film dielectric, ionic contamination is preferrably avoided. Agerite ® MA antioxidant contains sodium chloride and it is recommended that this be removed prior to addition to the compound containing an arylcyclobutene moiety. It can be removed by contacting the antioxidant with water to extract the sodium chloride Preferrably it is dissolved in an organic solvent such as mesitylene to enhance the extraction. The antioxidant may then be isolated from the solvent and water by decantation, vacuum distillation and/or freeze drying.

Illustrative Embodiments

The following examples are given to illustrate the invention and should not be interpreted as limiting it in any way. Unless stated otherwise, all parts and percentages are given by weight.

Procedure A: Preparation of a Bisbenzocyclobutene Monomer Represented by the Formula:

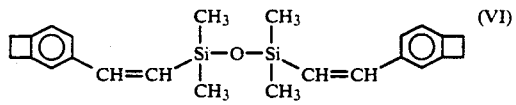

A solution of 3.0 grams (g) ($1.64 \times 10^{-2}$m) 4-bromobenzocyclobutene, 1.52 g ($8.2 \times 10^{-3}$m) 1,3-divinyl-1,1,3,3-tetramethyldisiloxane, 1.66 g ($1.64 \times 10^{-2}$m) triethylamine, 0.152 g ($5.0 \times 10^{-4}$m) tri-o-tolylphosphine, 72 milligrams (mg) ($3.21 \times 10^{-4}$m) palladium (II) acetate, and 10 cm$^3$ acetonitrile in a 50 cm$^3$ 2-neck round bottom flask equipped with a reflux condenser and magnetic stirring bar is heated to reflux for 24 hours. After 24 hours, the reaction mixture is cooled to room temperature and then poured into 60 cm$^3$ of 10 percent aqueous hydrochloric acid. The resulting mixture is extracted with two 50 cm$^3$ portions of methylene chloride and the combined methylene chloride solutions were washed with three 100 cm$^3$ portions of water. The organic phase is dried over anhydrous magnesium sulfate, filtered, and evaporated in vacuo to yield a yellow oil. The oil is chromatographed on silica gel eluting with 20 percent toluene in heptane. The product was removed from the column and the solvent removed to yield a colorless oil. Reverse phase high performance liquid chromatography showed a mixture with one major component. $^1$H-NMR (CDCl$_3$) 7.3-6.1 (m, 10H), 3.2 (s, 8H), 0.2 (s, 12H) ppm.

Procedure B: Preparation of Bisbenzocyclobutene Monomer Derived From an Olefinic Aromatic Compound And Corresponding to the Formula

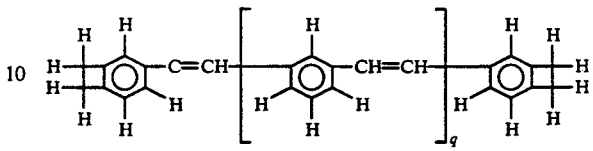

(a) q=3

A 25-cm$^3$ flask equipped with a reflux condenser, nitrogen inlet, and magnetic stirring bar is charged with m-dibromobenzene (1.0 g, $4.2 \times 10^{-3}$ m), m-divinylbenzene (2.75 g, $2.1 \times 10^{-2}$ m), tri-n-butylamine ($8.4 \times 10^{-3}$ m), tri-o-tolylphosphine (64 mg, $2.1 \times 10^{-4}$ m), palladium (II) acetate (20 mg, $8.4 \times 10^{-5}$ m), and acetonitrile (10 cm$^3$). The mixture is stirred under nitrogen and heated to reflux for 2 hours. The grey slurry is cooled to room temperature and stirred into 60 cm$^3$ of 10 percent aqueous hydrogen chloride. The resulting precipitate is collected by filtration, washed with water, and air dried. This product is dissolved in ethylacetate, filtered, and the solvent evaporated to yield a yellow residue.

Recrystallization of the residue from heptane gives 0.60 g (42 percent yield) of a compound of the formula

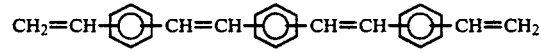

hereinafter referred to as diterminal olefin, with a melting point of 105° C.

A 25-cm$^3$ flask equipped with a reflux condenser, nitrogen inlet and magnetic stirring bar is charged with 4-bromobenzocyclobutene (1.5 g, $8 \times 10^{-3}$ moles), the diterminal olefin from part A (1.34 g, $4 \times 10^{-3}$ moles), tri-n-butylamine (1.8 g, $9.7 \times 10^{-3}$ moles), tri-o-tolylphosphine (62 mg, $4.0 \times 10^{-4}$ moles), palladium II acetate (18 mg, $8.0 \times 10^{-5}$ moles) and acetonitrile (5 cm$^3$). The reaction mixture is heated to reflux under nitrogen for 4 hours. The mixture is cooled to room temperature and stirred into 60 cm$^3$ of 10 percent hydrochloric acid. The precipitate is collected by filtration, washed with water and air dried. The dried precipitate is then dissolved in 150 cm$^3$ of boiling toluene, filtered hot and cooled to yield 310 mg of the product q=3. The monomer has a melting point of 180° C.-215° C.

(b) q=1

A 25-cm$^3$ flask equipped with a reflux condenser, nitrogen inlet, and magnetic stirring bar is charged with 4-bromobenzocyclobutene (1.50 g, $8.0 \times 10^{-3}$ m), m-divinylbenzene ($4.0 \times 10^{-3}$ m), tri-n-butylamine (1.8 g, $9.7 \times 10^{-3}$ m), tri-o-tolylphosphine (62 mg, $4.0 \times 10^{-4}$ m), palladium (II) acetate (18 mg, $8.0 \times 10^{-5}$ m), and acetonitrile (5 cm$^3$). The reaction mixture is heated to reflux under nitrogen with stirring for 4 hours. The solidified mixture is cooled to room temperature and stirred into 60 cm$^3$ of 10 percent aqueous hydrogen chloride. The resulting precipitate is collected by filtration, washed with water, and air dried.

The precipitate is dissolved in 75 cm$^3$ of boiling ethylacetate, filtered hot, and cooled to yield 800 mg (60 percent) of the desired monomer with a melting point of 150° C.-152° C.

Procedure C

A Partially Polymerized Composition From The Compound Of The Bisbenzocyclobutene Derived From Meta-Divinyl Benzene Of Procedure B (b)

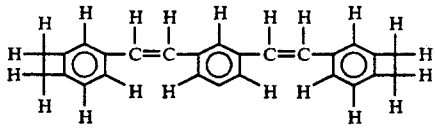

A 1 g sample of the monomer of Procedure B (b) is heated from 189° to 222° C. at the rate of 1° C. per minute. The partially polymerized composition has a viscosity of 249 poise at 220° C., the partially polymerized composition is solid at room temperature and becomes gel-like at 180° to 190° C. The partially polymerized composition contains 51 percent unreacted polymerizable functionality as determined by differential scanning calorimetry.

EXAMPLES

The noted antioxidant is dissolved in a partially thermally polymerized 1,3-bis(2-bicyclo[4.2.0]octa-1,3,5-trien-3-ylethenyl)-1,1,3,3-tetramethyldisiloxane, available as a solution in mesitylene from The Dow Chemical Company as XU13005.02L at one weight percent based on the weight of the prepolymer. A control, containing no antioxidant, is run for comparison purposes. The solutions are spin coated onto oxide free silicon wafers at thicknesses resulting in polymer coatings of about ten microns.

The coating thickness can be controlled by selecting the viscosity of the solution, the spin speed and the spin time. Viscosity may be controlled by adjusting the concentration of prepolymer in the solution. Preferably, a solution containing 55% DVS prepolymer in mesitylene and 1% antioxidant based on the weight of the prepolymer is puddled onto a silicon wafer. The wafer is then spun for about 3 seconds at 500 rpm and then spun for about 30 seconds at 5000 rpm to spread the prepolymer evenly.

After spin coating a film, the solvent is evaporated and the film is thermally cured at 250° C. for one hour under a nitrogen atmosphere, preferably containing less than 100 ppm oxygen. The cured-polymer coated wafers are then placed in air purged ovens at the temperatures noted and ar withdrawn periodically to obtain FT-IR spectral absorbance measurements.

Lifetimes of the films are based on the time it takes the absorbance at 1500 cm$^{-1}$ to reach 80% of its initial value. This band indicates the presence of tetralin which contains the benzylic hydrogens. Comparisons have shown that this corresponds to about a 10% increase in the dielectric constant which is the real indicator of interest in thin film dielectrics.

The use of silicon wafers permits the taking of the absorbance spectral measurements through the transparent wafer and polymer film without degrading the film.

Absorbance measurements in this context refer to the definition given by:

$$A = -\log T$$

wherein T is the transmittance and A is the absorbance. Transmittance is defined as:

$$T = I_s/I_b$$

wherein $I_s$ is the intensity of light transmitted by the cured-polymer coated silicon wafer and $I_b$ is the intensity of light transmitted by the silicon wafer alone.

The absorbance band at 1500 cm$^{-1}$ typically does not have a local baseline at zero absorbance. Therefore, the absorbance at 1500 cm$^{-1}$ is measured relative to a line connecting two points taken as the local spectral baseline. 1520cm$^{-1}$ and 1470 cm$^{-1}$ may advantageously be used to define the local baseline.

The lifetime of the control at 100° C. is greater than 3500 hrs. Lifetimes of cured DVS with 1% by weight of the noted antioxidants, at oven temperatures of 125° C. and 150° C. are shown in the TABLE.

TABLE

Polymer/Antioxidant Lifetimes

| Sample | | Lifetime (Hrs) | |
|---|---|---|---|
| | | at 150° C. | at 125° C. |
| 1 | *Control | 97 | 450 |
| 2 | *AgeRite Stalite ® (Vanderbilt) | 94 | 447 |
| 3 | *bis(diphenyl phosphino) methane | 95 | 440 |
| 4 | *Irganox ® 1076 (CIBA-GEIGY) | 95 | 456 |
| 5 | *AgeRite ® DPPD (Vanderbilt) | 100 | 482 |
| 6 | *Irganox ® B215 (CIBA-GEIGY) | 108 | 528 |
| 7 | Wingstay ® 29 (Goodyear) | 121 | 669 |
| 8 | Irganox ® 1035 (Ciba-Geigy) | 127 | 631 |
| 9 | Irganox ® 1010 (Ciba-Geigy) | 131 | 678 |
| 10 | AgeRite ® MA (Vanderbilt) | 431 | 2790 |

* not an example of the invention

Testing with fully hydrogenated DVS polymers and other fully saturated bisbenzocyclobutene polymers indicates that similar extensions of polymer lifetimes may be obtained.

What is claimed is:

1. A composition comprising either a compound containing an arylcyclobutene moiety which is capable of polymerizing by side ring opening, a prepolymer or polymer thereof and a stabilizing amount of an antioxidant selecting from the group consisting of formulas:

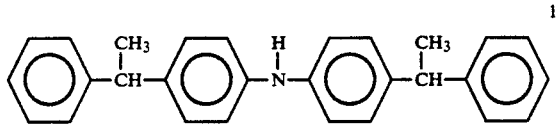

1)

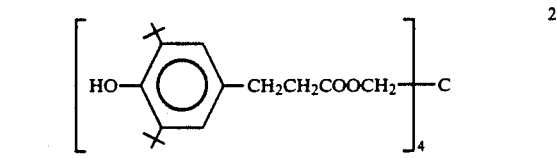

2)

3)

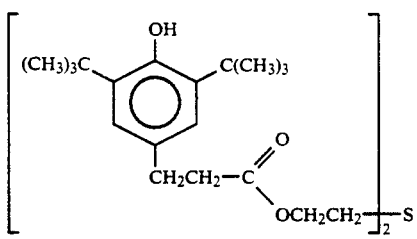

4)

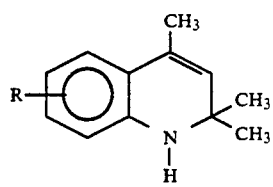

wherein
R is hydrogen, an electron withdrawing or electron donating group; and oligomers thereof; or
5) hindered amines of the formula:

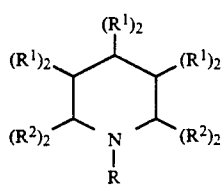

wherein
R is hydrogen, an electron withdrawing group or an electron donating group:
each $R^1$ is independently, hydrogen, an electron withdrawing group or an electron donating group, with the proviso that two $R^1$ attached to the same carbon may represent a single moiety joined to said carbon by a double bond;
each $R^2$ is independently, methyl, ethyl, n-propyl or isopropyl:
said antioxidant being effective to inhibit oxidation of polymer formed by side ring opening of the arylcyclobutene.

2. The composition of claim 1 wherein the antioxidant is a compound of the formula:

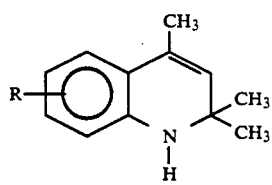

wherein
R is hydrogen, an electron withdrawing or electron donating group: or an oligomer thereof.

3. The composition of claim 2 wherein the antioxidant is a compound selected from the group consisting of 2,2,4-trimethyl-1,2-dihydroquinoline, oligomers thereof, oligomers thereof with the terminal vinyl group removed, 6-ethoxy-2,2,4-trimethyl-1,2-dihydroquinoline and 6-dodecyl-2,2,4-trimethyl-1,2-dihydroquinoline.

4. The composition of claim 3 wherein the antioxidant is an oligomer of 2,2,4-trimethyl-1,2-dihydroquinoline with a degree of polymerization of about 3 or 4.

5. The composition of claim 4 wherein the compound with an arylcyclobutene moiety is a compound of the formula:

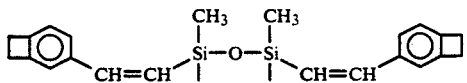

or a prepolymer or polymer thereof.

6. The composition of claim 5 wherein the compound with an arylcyclobutene moiety is a partially thermally polymerized prepolymer.

7. A composition containing a polymer formed by side ring opening of an arylcyclobutene compound and an antioxidant selected from the group consisting of compounds of the formulas:

1)

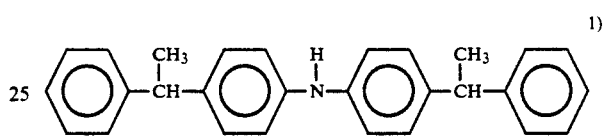

2)

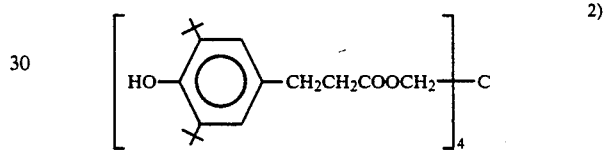

3)

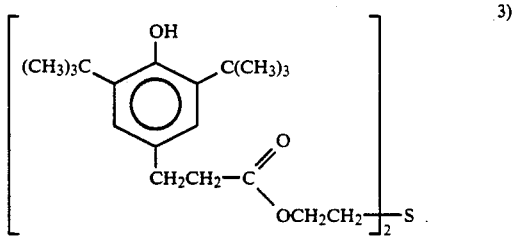

4)

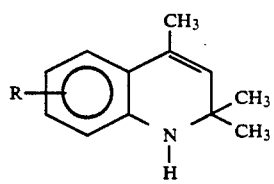

wherein
R is hydrogen, an electron withdrawing or electron donating group; and oligomers thereof; or
5) hindered amines of the formula:

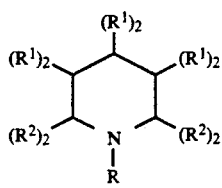

wherein
R is hydrogen, an electron withdrawing group or an electron donating group;

each R¹ is independently, hydrogen, an electron withdrawing group or an electron donating group, with the proviso that two R¹ attached to the same carbon may represent a single moiety joined to said carbon by a double bond;

each R² is independently, methyl, ethyl, n-propyl or isopropyl:

said antioxidant being effective to inhibit oxidation.

8. A method for inhibiting oxidation of a polymer formed by the side ring opening of compounds containing one or more arylcyclobutene moieties by adding to the compound, a partially polymerized prepolymer of said compound or a polymer of the compound, an amount of an antioxidant sufficient to inhibit oxidation of said said polymer, said antioxidant being selected from the group consisting of:

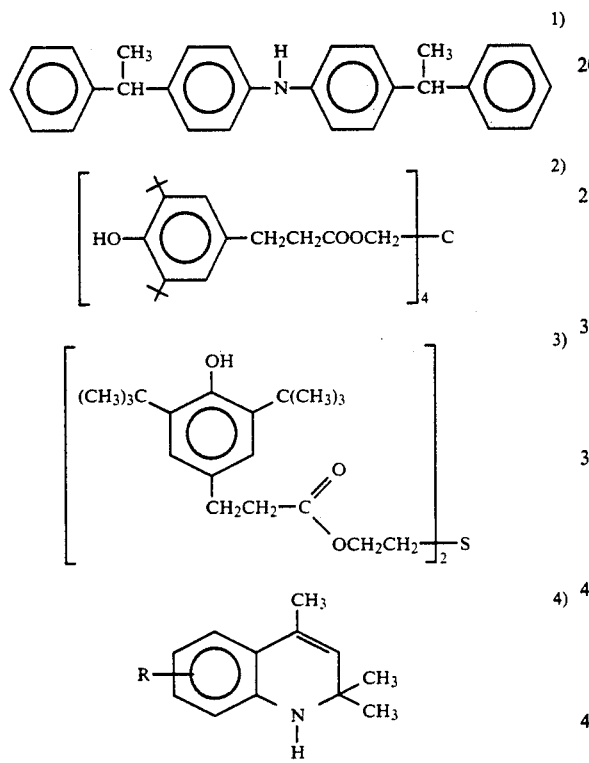

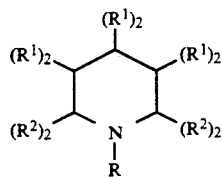

wherein
R is hydrogen, an electron withdrawing or electron donating group; and oligomers thereof; or 5) hindered amines of the formula:

wherein
R is hydrogen, an electron withdrawing group or an electron donating group:
each R¹ is independently, hydrogen, an electron withdrawing group or an electron donating group, with the proviso that two R¹ attached to the same carbon may represent a single moiety joined to said carbon by a double bond;
each R² is independently, methyl, ethyl, n-propyl or isopropyl.

9. An article containing a component which is a polymer formed by side ring opening of an arylcyclobutene moiety and an antioxidant in an amount sufficient to inhibit oxidation of the polymer, said antioxidant being selected from the group consisting of:

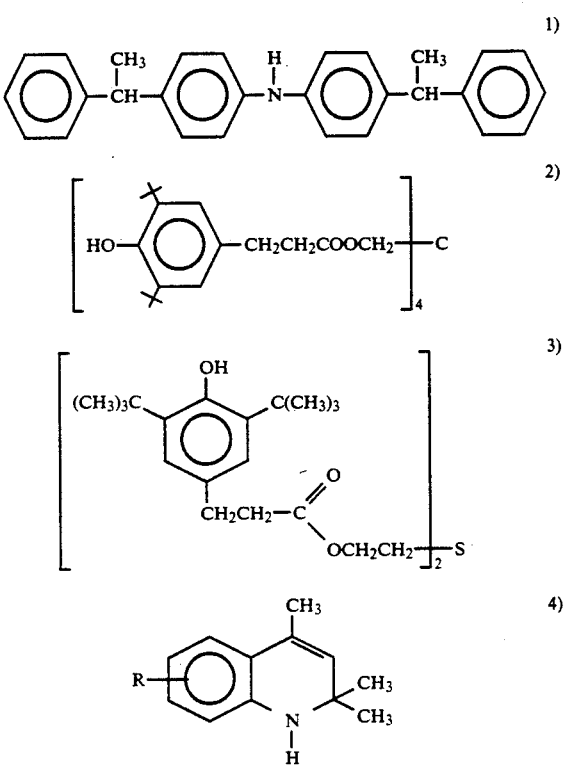

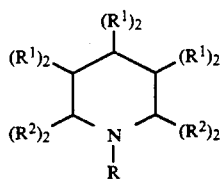

wherein
R is hydrogen, an electron withdrawing or electron donating group; and oligomers thereof; or 5) hindered amines of the formula:

wherein
R is hydrogen, an electron withdrawing group or an electron donating group:
each R¹ is independently, hydrogen, an electron withdrawing group or an electron donating group, with the proviso that two R¹ attached to the same carbon may represent a single moiety joined to said carbon by a double bond:
each R² is independently, methyl, ethyl, n-propyl or isopropyl.

* * * * *